April 13, 1965   TADATO FUJIMURA ETAL   3,177,577
METHOD OF BONDING GRAPHITE ARTICLES
WITH IRON-BASE BRAZING ALLOYS
Filed Feb. 17, 1961
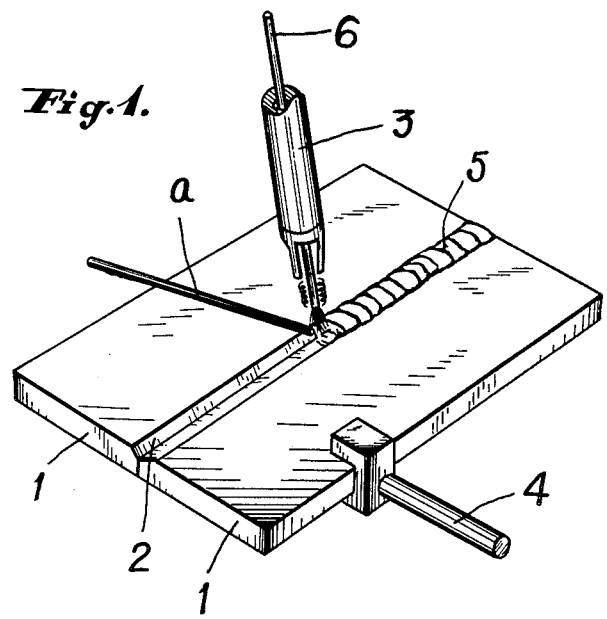
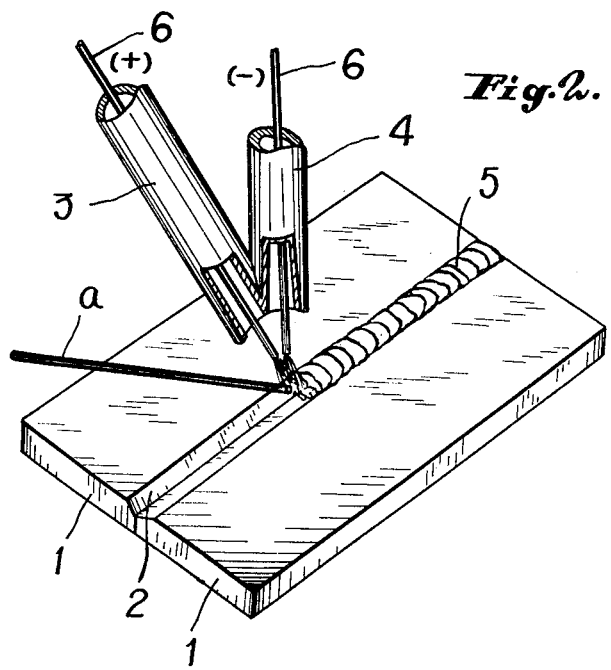
INVENTORS.
TADATO FUJIMURA &
YOSHIO ANDO
BY
their ATTORNEYS.

United States Patent Office 3,177,577
Patented Apr. 13, 1965

3,177,577
METHOD OF BONDING GRAPHITE ARTICLES WITH IRON-BASE BRAZING ALLOYS
Tadato Fujimura, Arayadai, Tokai-mura, Naka-gun, and Yoshio Ando, Tokyo, Japan, assignors to Japan Atomic Energy Research Institute, Tokyo, Japan
Filed Feb. 17, 1961, Ser. No. 90,068
Claims priority, application Japan, Feb. 27, 1960, 6,330/60, 6,331/60, 6,332/60
5 Claims. (Cl. 29—472.7)

This invention relates to a method of bonding graphite articles by means of iron-base brazing alloys.

The principal object of this invention is to obtain an extremely firm and leak-tight joint between graphite articles, and more particularly graphite blocks to be used in nuclear reactors.

In nuclear reactors, a large amount of graphite is used as the material for the moderator of fast neutrons and also as the canning material of fuels. Since graphite is a non-metallic substance and brittle, its shaping and working are difficult in the construction and design of nuclear reactors and the perfect bonding of graphite articles has been considered almost impossible up to the present time. The conditions of bonding graphite articles used in nuclear reactors are as follows:

(1) The smallest possible amount of brazing material should be used in order to reduce the absorption of neutrons.

(2) Possibility of leak-tight brazing joint.

(3) Less corrosion due to the colant (in order to effectively utilize the high corrosion resistance of graphite the corrosion resistance should be particularly high).

(4) Sufficiently high bonding strength should be maintained at high temperatures (though graphite is very stable at high temperatures it is desirable that the bonded portion might have such strength effective at a temperature of about 800° C. in the reactor).

(5) Sufficiently high bonding strength should be maintained during the whole thermal cycle of operation (since graphite has a small coefficient of thermal expansion the brazing material should have a comparable coefficient of thermal expansion).

(6) Bonding proces should be simple and adapted for mass production.

(7) Accuracy of dimensions should be positively assured.

Various kinds of cementing materials have been used in Japan for the bonding of graphite, but such materials could not sufficiently fulfill the above mentioned conditions (1), (2), (3), (5) and (7).

In some foreign countries, the brazing is effected by using zirconium and titanium as the brazing material, but such metals are highly oxidizable materials so that the brazing process is very difficult, is costly and is not very practical.

The present invention has been achieved after the result of various investigations and experiments for obviating the above described defects, and has been found a very splendid bonding process compared with the heretofore known process of using cement and other metallic brazing materials and satisfies the above mentioned conditions (1) to (7) for bonding graphite articles to be used in nuclear reactors, by using iron-base alloys as brazing material.

According to this invention, the brazing alloys consist of iron and one or more of the following—chromium, nickel, molybdenum, tungsten, titanium, zirconium and carbon.

For instance, the following alloys are preferable:

Fe-Cr-C, Fe-Ni-C, Fe-Ni-Cr-C, Fe-Cr-Ni-Mo-C

The following range of compositions have been found applicable to the present invention.

|   | Cr | Ni | Mo, W, Ti or Zr | C | Fe |
|---|---|---|---|---|---|
| 1 | 10 to 40% | 0 | 0 | Less than 0.2%. | Remaining. |
| 2 | 0 | 10 to 50% | 0 | do | Do. |
| 3 | 16 to 30% | 6 to 25% | 0 to 4% | do | Do. |

The reason why the above mentioned compositions are taken is as follows:

Chromium is an essential ingredient for maintaining corrosion resistance and the good adhering property of the Fe-Cr brazing alloy used in the method of this invention. With less than 10% chromium, the composition is not effective as a corrosion resisting element, while the addition of more than 40% chromium causes almost no improvement in the high temperature corrosion resistance except to result in high cost so that it is not necessary in practice.

The addition of 10 to 50% nickel to the iron base increases its strength and corrosion resistance at high temperatures, and the iron-Ni alloy has a very small thermal coefficient of expansion that is nearly equal to the coefficient of thermal expansion of graphite so that the brazing result is very good. On the other hand, the coefficient of thermal expansion increases rapidly at a range less than 10% or more than 50% nickel and the adhering properties become worse so that according to the present invention 10 to 50% by weight of nickel in the brazing alloy was found very practical.

The brazing iron-base alloys containing chromium and nickel with or without the addition of molybdenum, tungsten, zirconium or titanium can also be used in this invention. In this case, the composition of 16 to 30% of Cr, 6 to 25% of Ni, 0 to 4% of Mo, W, Ti or Zr, less than 0.2% of C, with the remaining portion being of Fe (all by weight percent) is most suitable. The addition of molybdenum, tungsten, titanium or zirconium further maintains the high temperature strength of the alloy.

The thermal characteristics of the brazing alloys are as follows:

| Alloys | Coefficient of thermal expansion | Melting Point | Corrosion resistance | Magnetic property | High temperature strength | Tension test at room temp. |
|---|---|---|---|---|---|---|
| (1) Fe-Cr | 10 to 13×10⁻⁶ | 1,430 to 1,510° C | Good | None | Sufficient up to 700° C. | No breaking. |
| (2) Fe-Cr-Ni-Mo | 17 to 20×10⁻⁶ | 1,370 to 1,430° C | Better | do | Sufficient up to 900° C. | Do. |
| (3) Fe-Ni | 2 to 10×10⁻⁶ | 1,420 to 1,470° C | do | do | do | Do. |

The brazing according to this invention can be carried out by different processes such as (1) induction brazing and (2) arc-brazing.

(1) The induction brazing may be effected by filling pieces of a brazing wire or powders of the above mentioned brazing material, in a groove or recess formed between the adhering portion of graphite articles. The assembly is heated in a vacuum furnace under a vacuum of $10^{-1}$ to $10^{-5}$ mm. Hg or in an inert gas atmosphere such as argon, helium or nitrogen, or in an atmosphere of active ammonium or hydrogen to a bonding temperature of from 1,200 to 1,600° C.

The strength test of the brazed joint was carried out by preparing graphite rods put together in butt joint relationship and bonded in a vacuum of $5 \times 10^{-4}$ mm. Hg at 1,350° C. by using the brazing material of this invention. A tension test piece was taken from the graphite rod thus bonded and subjected to the high temperature tension test at 900° C. in an argon atmosphere. The results showed that the sample did not break down at the joint portion but was broken along the body of the material.

The bending test according to the Japanese Industrial Standard was carried out at room temperature for the joint portion of the brazed graphite rods, which passed the test.

As to the neutron economy in a reactor the results of calculations showed that if the brazing material is about 1/2,500 of the mass of graphite used, the neutron absorption cross section of the graphite structure increases about 10%. This shows that the use of the brazing material for joining the structures of a reactor would not cause troubles in the design of internal construction of the reactor.

(2) The graphite articles can also be united together by an arc brazing using any of the above mentioned brazing alloys in an open atmosphere, by preventing oxidation of the graphite and brazing material, using a gas shielded arc brazing torch, thereby melting the brazing materials by the heat developed by the electric arc. In carrying out the method of this invention the following two methods may be used:

(a) One method is to use the graphite articles to be brazed as an anode (or cathode) and the electrode enclosed in a brazing torch as a cathode (or anode). An electric arc is generated between the graphite and the electrode in the torch.

(b) Another method uses a gas shielded arc brazing torch in which are enclosed a positive electrode and a negative electrode, with an electric arc being generated between these electrodes, while shielding gas is blown out of the torch.

For a better understanding of the manner of carrying out the arc brazing of this invention reference is had to the accompanying drawings, in which FIGS. 1 and 2 are perspective views illustrating two embodiments for carrying out arc brazing of graphite blocks.

Referring to FIG. 1, the reference numerals 1—1 represent graphite blocks to be welded, and 2 a groove or recess formed between the graphite blocks 1 and 1. 3 is a torch directed towards the joined portion, 4 a conducting terminal electrically connected to the graphite block, 5 the brazed material, 6 an electrode and $a$ a brazing filler wire according to this invention.

Referring to FIG. 2, 1—1 represent two graphite blocks to be brazed, 2 is a groove formed between the graphite blocks, such recess facilitating sound bonding, 3 and 4 are torches including positive and negative electrodes respectively directed to the joined portion, and 5 is the brazed material after the bonding is finished, and 6—6 represent electrodes, and $a$ the brazing filler wire according to this invention. In case of FIG. 2, electric arcs are struck between tips of two electrodes 6 and 6 and the arc welding is carried out by blowing out shielding gas through the torches.

As the kind of shielding gas for carrying out the above brazing process, argon, helium, carbon dioxide gas, nitrogen or hydrogen is most suitable. Such gas may be issued through the brazing torch in the open air, or the brazing may be carried out in an air tight chamber enclosing the above shielding gas.

When graphite plates or pipes were bonded together by using a brazing material of iron-base alloys consisting of 36% nickel by weight and 64% iron by weight by an electric arc the following conditions are used:

Arc voltage: D.C. 30 to 50 volts.
Arc current: D.C. 100 to 200 amps.
Shielding gas: Argon.
Gas flow: 10 to 20 liters/minute.

As to the neutron economy in a reactor, the results of calculations showed that when the brazing alloy was about 1/3,000 of the mass of graphite is used the neutron absorption cross section of the graphite structure increases about 10%.

This apparently shows that use of the brazing material of this invention for the bonding of reactor elements gives no troubles in the design of internal structure of the reactor.

It has been ascertained that the joint portion of graphite bonded by the method of this invention has improved characteristics as shown by the following:

(1) The results of static bending test of the bonded joint showed that the bending strength of the bonded portion was more than 150 kg./cm.$^2$.

(2) When the sample is heated to 700° C. and then quickly cooled in air no crack occurred in the bonded portion.

(3) As the result of leakage tests of the joint no leakage was found.

By using the brazing alloys for the arc brazing of graphite articles difficulties in shaping and working of graphite articles can be minimized, so that the utilization of graphite in nuclear reactors can be increased.

What we claim is:

1. A method of joining graphite articles by means of iron-base alloys as brazing material, which comprises carrying out the brazing by filling a recess formed between abutted edges on the upper surfaces of two graphite articles to be joined with fused brazing material of iron-base alloys consisting of 10 to 50% by weight of nickel, less than 0.2% of carbon and the remaining substantially of iron, by heating the brazing material to a temperature of from 1,200 to 1,600° C. by an electric arc in a shielding gas atmosphere.

2. The method of claim 1 wherein the electric arc is generated between the graphite and a brazing torch.

3. The method of claim 1 wherein the electric arc is generated between two electrodes carried in a brazing torch.

4. A method of welding graphite surfaces which comprises filling a recess formed between abutting edges of two graphite surfaces with a molten alloy consisting of 16 to 30% by weight of chromium, 6 to 25% nickel, 0 to 4% of an element from the group consisting of molybdenum, tungsten, titanium, and zirconium, less than 0.2% carbon and the balance substantially of iron, said alloy being melted by an electric arc in a shielding gas atmosphere.

5. A method of welding graphite surfaces which comprises filling a recess formed between abutting edges of two graphite surfaces with a molten alloy consisting of 16 to 30% by weight of chromium, 6 to 25% nickel, 0 to 4% of an element from the group consisting of molybdenum, tungsten, titanium, and zirconium, less than 0.2% carbon and the balance substantially of iron, said alloy being melted by an electrical induction in a shielding gas atmosphere.

References Cited by the Examiner

UNITED STATES PATENTS

| | | | |
|---|---|---|---|
| 1,946,305 | 2/34 | Catlett | 219—75 |
| 2,431,975 | 12/47 | Yockey. | |
| 2,739,375 | 3/56 | Coxe | 29—504 X |
| 2,770,030 | 11/56 | Carpenter et al. | 29—504 X |

FOREIGN PATENTS 587,622  11/59  Canada.

JOHN F. CAMPBELL, *Primary Examiner.*

WHITMORE A. WILTZ, *Examiner.*